US010015709B2

(12) United States Patent
Yu et al.

(10) Patent No.: US 10,015,709 B2
(45) Date of Patent: Jul. 3, 2018

(54) HANDOVER OF A USER EQUIPMENT HAVING OFFLOADED USER DATA TRAFFIC BETWEEN TWO SMALL CELLS CONTROLLED BY DIFFERENT MACRO CELLS

(71) Applicant: Nokia Solutions and Networks Oy, Espoo (FI)

(72) Inventors: Ling Yu, Espoo (FI); Vinh Van Phan, Oulu (FI); Kari Veikko Horneman, Oulu (FI)

(73) Assignee: HMD Global Oy, Espoo (FI)

( * ) Notice: Subject to any disclaimer, the term of this patent is extended or adjusted under 35 U.S.C. 154(b) by 91 days.

(21) Appl. No.: 14/765,032

(22) PCT Filed: Feb. 14, 2013

(86) PCT No.: PCT/EP2013/052968
§ 371 (c)(1),
(2) Date: Jul. 31, 2015

(87) PCT Pub. No.: WO2014/124673
PCT Pub. Date: Aug. 21, 2014

(65) Prior Publication Data
US 2015/0365860 A1    Dec. 17, 2015

(51) Int. Cl.
*H04W 36/00* (2009.01)
*H04W 36/04* (2009.01)
(Continued)

(52) U.S. Cl.
CPC ........... *H04W 36/04* (2013.01); *H04W 36/22* (2013.01); *H04W 36/02* (2013.01); *H04W 36/08* (2013.01); *H04W 36/36* (2013.01)

(58) Field of Classification Search
CPC ..... H04W 36/04; H04W 48/20; H04W 24/10; H04W 36/22; H04W 36/30; H04W 24/02;
(Continued)

(56) References Cited

U.S. PATENT DOCUMENTS 8,886,198 B2 * 11/2014 Tinnakornsrisuphap
............................ H04W 36/04
455/436
2013/0005344 A1 * 1/2013 Dimou .............. H04W 36/0083
455/441
(Continued)

FOREIGN PATENT DOCUMENTS

WO   WO 2014/000808 A1   1/2014
WO   WO 2014/067567 A1   5/2014

OTHER PUBLICATIONS

3GPP TSG RAN WG1 Meeting #72, St. Julian's Malta, Jan. 28-Feb. 1, 2013, R1-130743, "Scenario and Candidate Technologies for Small Cell Enhancement", NTT DOCOMO, 9 pgs.
(Continued)

*Primary Examiner* — Joseph Arevalo
(74) *Attorney, Agent, or Firm* — Harrington & Smith

(57) ABSTRACT

To reduce handover latency experienced by a user using a user equipment that is served for offloaded user data traffic by a first small cell, a handover between a first macro cell deploying the first small cell and a second macro cell deploying a second small cell is triggered when information indicating that the user equipment has associated with the second small cell not deployed by the first macro cell is received.

19 Claims, 6 Drawing Sheets

(51) Int. Cl.
*H04W 36/22* (2009.01)
*H04W 36/02* (2009.01)
*H04W 36/08* (2009.01)
*H04W 36/36* (2009.01)

(58) Field of Classification Search
CPC ............ H04W 36/32; H04W 52/0251; H04W 76/046; H04W 36/245; H04W 4/02; H04W 4/023; H04W 4/16
USPC ....... 455/437, 436, 434, 443, 509, 438, 441, 455/442, 444, 517
See application file for complete search history.

(56) References Cited

U.S. PATENT DOCUMENTS

| | | | | |
|---|---|---|---|---|
| 2013/0079047 | A1* | 3/2013 | Nilsson | H01Q 3/24 455/509 |
| 2013/0079048 | A1* | 3/2013 | Cai | H04W 48/16 455/517 |
| 2013/0121222 | A1* | 5/2013 | Luo | H04W 36/20 370/311 |
| 2013/0310048 | A1* | 11/2013 | Hunukumbure | H04W 52/0206 455/443 |
| 2013/0316713 | A1* | 11/2013 | Xu | H04W 36/32 455/438 |
| 2014/0038598 | A1* | 2/2014 | Ren | H04W 48/16 455/434 |
| 2014/0066074 | A1* | 3/2014 | Folke | H04W 36/08 455/437 |
| 2014/0185467 | A1* | 7/2014 | Heo | H04W 52/0216 370/252 |
| 2015/0043435 | A1* | 2/2015 | Blankenship | H04L 69/322 370/329 |
| 2015/0045029 | A1* | 2/2015 | Dalsgaard | H04W 36/0083 455/436 |
| 2015/0045032 | A1* | 2/2015 | Tomici | H04W 36/04 455/436 |
| 2016/0205607 | A1* | 7/2016 | Singh | H04W 36/04 455/437 |
| 2016/0219473 | A1* | 7/2016 | Teyeb | H04W 36/0088 |

OTHER PUBLICATIONS

3GPP TSG RAN WG2 Meeting #81, St. Julian's, Malta, Jan. 28-Feb. 1, 2013, R2-130112, "Identifications of small cell development scenarios and expected benefits of dual connectivity", 4 pgs.

3GPP TSG-RAN WG2 Meeting #81, Malta, Jan. 28-Feb. 1, 2013, R2-130657, "Discussion about dual connectivity", 6 pgs.

3GPP TR 36.932 V12.0.0 (Dec. 2012), "$3^{rd}$ Generation Partnership Project; Technical specification Group Radio Access Network; Scenarios and requirements for Small Cell Enhancements for E-UTRA and E-UTRAN (Release 12)", 14 pgs.

Ericsson White Paper, Jan. 2013, "LTE Release 12—Taking Another Step Toward the Networked Society", 12 pgs.

* cited by examiner

US 10,015,709 B2

HANDOVER OF A USER EQUIPMENT HAVING OFFLOADED USER DATA TRAFFIC BETWEEN TWO SMALL CELLS CONTROLLED BY DIFFERENT MACRO CELLS

FIELD

The present invention relates to an inter-small cell handover requiring an inter-macro cell handover.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

In recent years, the phenomenal growth of mobile Internet services and proliferation of smart phones and tablets has increased a demand for mobile broadband services. One solution to provide higher network capacity and enhanced user experience is a network topology using a mix of macro cells and small cells. An exemplary system based on such a network topology includes an enhanced Long Term Evolution (LTE) macro cells deploying local access points, in which some user traffic to/from a user device may be offloaded to a small cell while control traffic to/from the user device uses a macro cell deploying the small cell. A user using the user device may walk from a small cell to another small cell that is deployed by another macro cell but the user expects that there are no service interruptions. However, an inter-small cell handover requiring an inter-macro cell handover will cause some latency to user traffic.

SUMMARY

An object of the invention is to reduce latency on a handover between two small cells deployed by different macro cells, and thereby the handover requiring a handover between the different macro cells. Various aspects of the invention comprise methods, apparatuses, a system and a computer program product as defined in the independent claims. Further embodiments of the invention are disclosed in the dependent claims.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system, radio access network and apparatus that support a principle of heterogeneous network access and splitting of control plane traffic and user plane traffic so that user plane traffic, or some of it, may be offloaded from a macro cell to a small cell while the control plane traffic remains in the macro cell. Herein, the principle of heterogeneous network access means use of at least two different types of access nodes in a wireless network, one of the types providing a small cell, another type providing a macro cell that may deploy one or more small cells. The two types of cells are likely deployed on different carriers but a co-channel deployment is also possible. Typically transmission power in a small cell is less than the transmission power in a macro cell, and hence the service area of a small cell is smaller than the service area of a macro cell. The system may be a wireless system or a system utilizing both fixed connections and wireless connections. The specifications of different systems and networks, especially in wireless communication, develop rapidly. Such development may require extra changes to an embodiment. Therefore, all words and expressions should be interpreted broadly and they are intended to illustrate, not to restrict, the embodiment.

Figure 1:
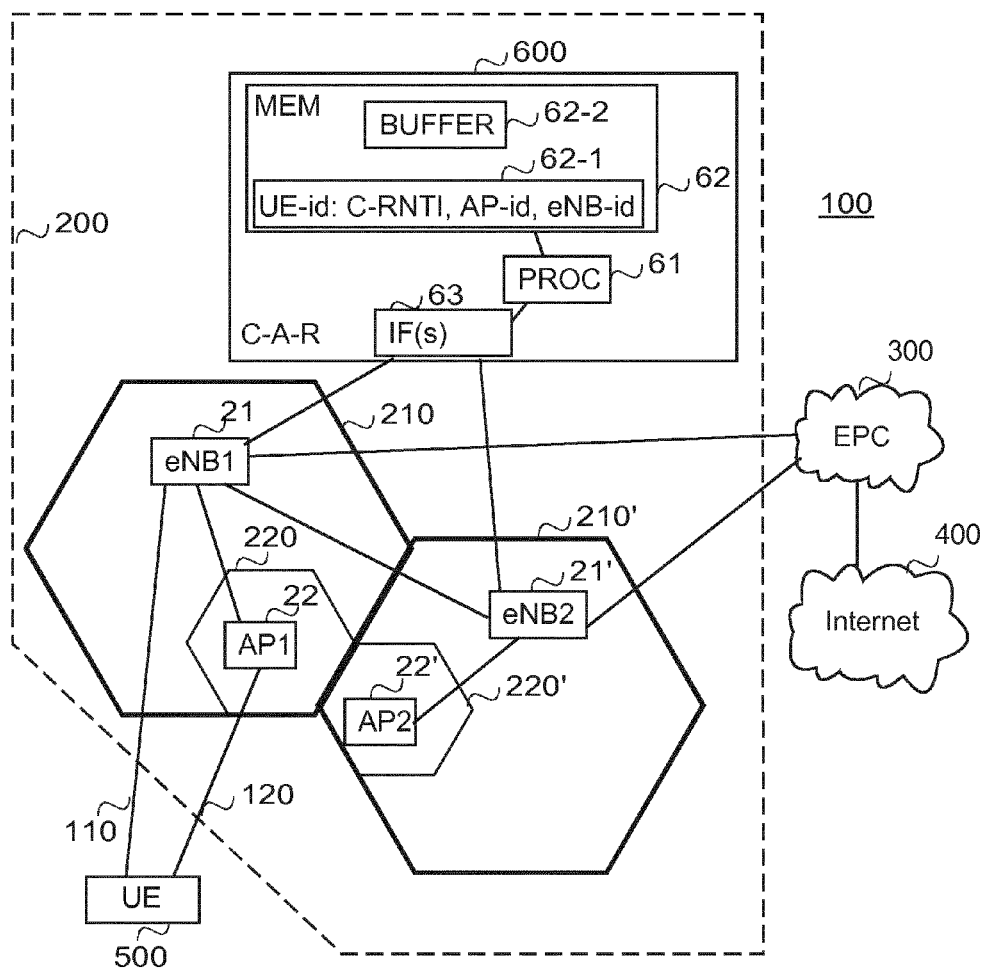
FIG. 1 shows simplified architecture of an exemplary system having a schematic block diagram of an exemplary apparatus.

A general architecture of an exemplary system 100 is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures that are not illustrated.

The illustrated parts of the system 100 in FIG. 1 are a radio access network 200, a core network 300, an external network 400 and a user equipment 500. The user equipment obtains services, like Internet browsing, provided by an external network 400 via the core network 300 and the radio access network 200.

The exemplary heterogeneous radio access network 200 is based on integrated/overlapping/shared radio access topologies that comprise macro cells 210, 210' (only two are shown in FIG. 1), and at least some of the macro cells, like the illustrated ones 210, 210' deploy (control) one or more small cells 220, 220' (only one per macro cell is shown in FIG. 1), each macro cell being provided by a corresponding macro base station 21, 21' and each small cell by a small base station 22, 22'. Typically but not necessarily small cells are likely to be provided by low cost base stations with limited advanced features and using low transmission power, at simplest providing a traffic path, whereas macro cells are likely to be provided with base stations capable of controlling radio communication and managing radio resources within a corresponding cell. A small cell may be also called a local cell.

In the example of FIG. 1, an evolved node B (eNB) 21, 21' depicts the macro base station and hence the radio access is based on LTE/SAE (Long Term Evolution/System Architecture Evolution) radio system. However, the embodiments described in these examples are not limited to the LTE/SAE radio systems but can also be implemented in other radio system, such as with at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE-A, and/or beyond LTE-A. The evolved node B 21, 21' provides the E-UTRA user plane (PDCP/RLC/MAC/PHY) and control plane (RRC) protocol terminations towards the user equipment. The evolved node Bs are interconnected with each other by means of X2 interface. The evolved node Bs are also connected to the EPC (Evolved Packet Core) 300, more specifically to a mobility management entity (not illustrated in FIG. 1) and to a serving gateway (not illustrated in FIG. 1).

In the example of FIG. 1, an access point 22, 22' depicts the small base station. The access point 22, 22' may be a Home node B (HeNB) providing a femto cell according to LTE or any other corresponding base station providing a small cell such as a pico cell or micro cell. Further, the access point 22, 22' may be a wireless local area network (WLAN) access point, like a Wi-Fi hot spot, or a wireless personal area network (WPAN) access point, or a free-space optical communications access point using infrared, for example. Hence, the type of the access point is irrelevant, it suffices that the access point is capable of providing wireless access. A connection between the access point and a macro base station deploying the access point may be a wireless or wired backhaul connection. Although not illustrated in FIG. 1, an access point may have a direct connection to the core network 300 or to the external network 400, the direct connection being usable as an additional backhaul connection for offloaded user plane traffic that does not pass via a macro base station deploying the access point although the control plane traffic passes via the macro base station.

In the illustrated example, the radio access network comprises an additional entity, a centralized access router (C-A-R) entity 600. In another implementation utilizing the centralized access router, the entity locates in the core network, and it may be integrated with a mobility management entity, for example. The centralized access router entity 600 maintains in a memory 62 mapping information 62-1 on active contexts of user equipments having offloaded user plane traffic. For example, for a user equipment 500 that has control plane traffic over a direct link 110 between the user equipment 500 and a macro base station 21 and at least some of the user plane traffic offloaded to pass via a small base station 22 and over a link 120 between the small base station 22 and the user equipment 500, active context is maintained. For example, the mapping information 62-1 may associate a user equipment identity (UE-id), such as a medium access control (MAC) address of the user equipment used for the association between the access point and the user equipment, if the access point is a WLAN access point, with cellular context of the active user equipment, like a Cell Radio Network Temporary Identifier (C-RNTI), serving small cell identity (AP-id) and serving macro base station address (eNB-id). The mapping information may contain also other information, like priority. In the illustrated example, the centralized access router 600 is further configured to temporarily store (i.e. buffer) in a buffer 62-1 in the memory 62 user data transmitted to a user equipment while user data traffic to the user equipment is suspended. The network node/apparatus implementing the centralized access router functionality/entity 600 comprises one or more interfaces 63 for receiving mapping information updates and queries relating to mapping information from macro base stations and for sending query responses, and one or more processors 61 configured to process queries and mapping information updates. Further, if the buffering is implemented, the one or more interfaces 63 provides an interface to receive user data traffic and to forward it, and related requests, and the one or more processors 61 is further configured to perform the buffering, including storing to the buffer 62-2 and forwarding from the buffer 62-2).

The radio access network may comprise two or more centralized access router entities, each being centralized for a specific service area.

Figure 3:
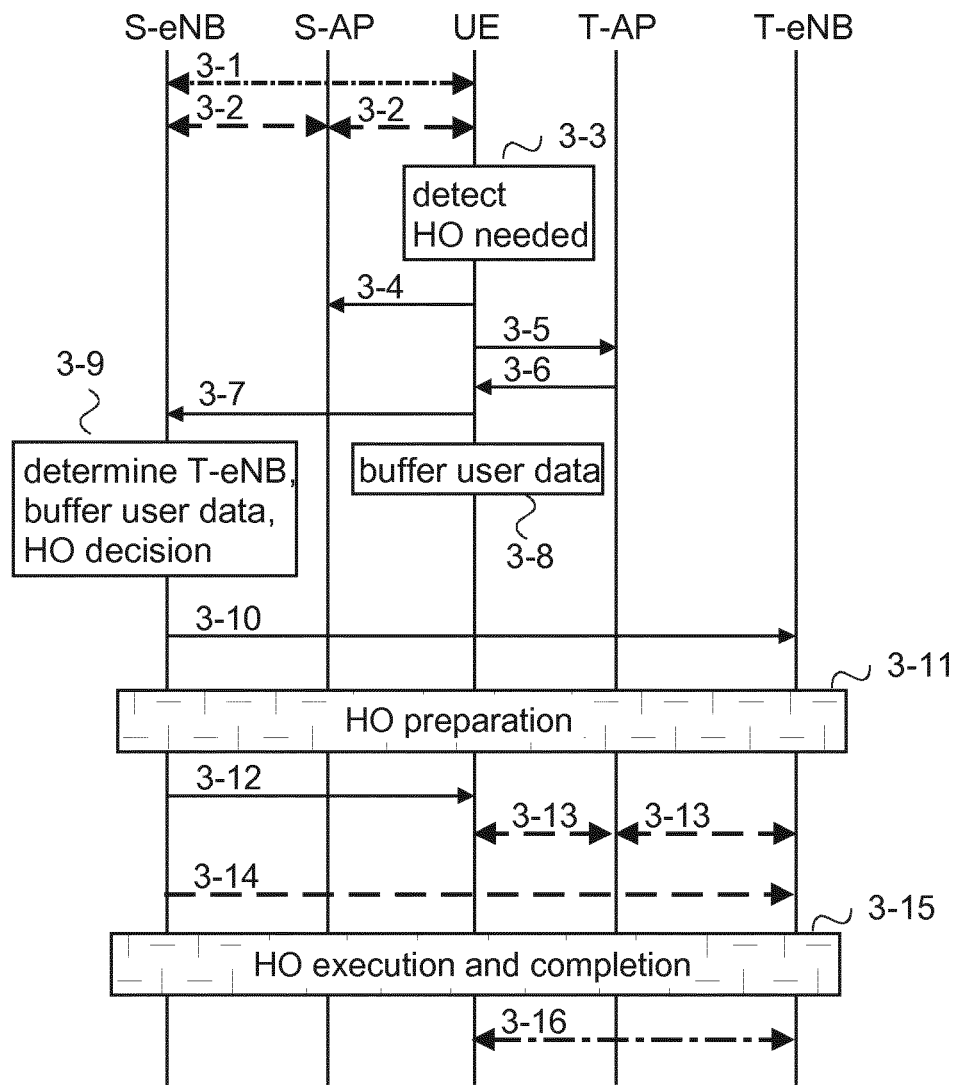
Figure 4:
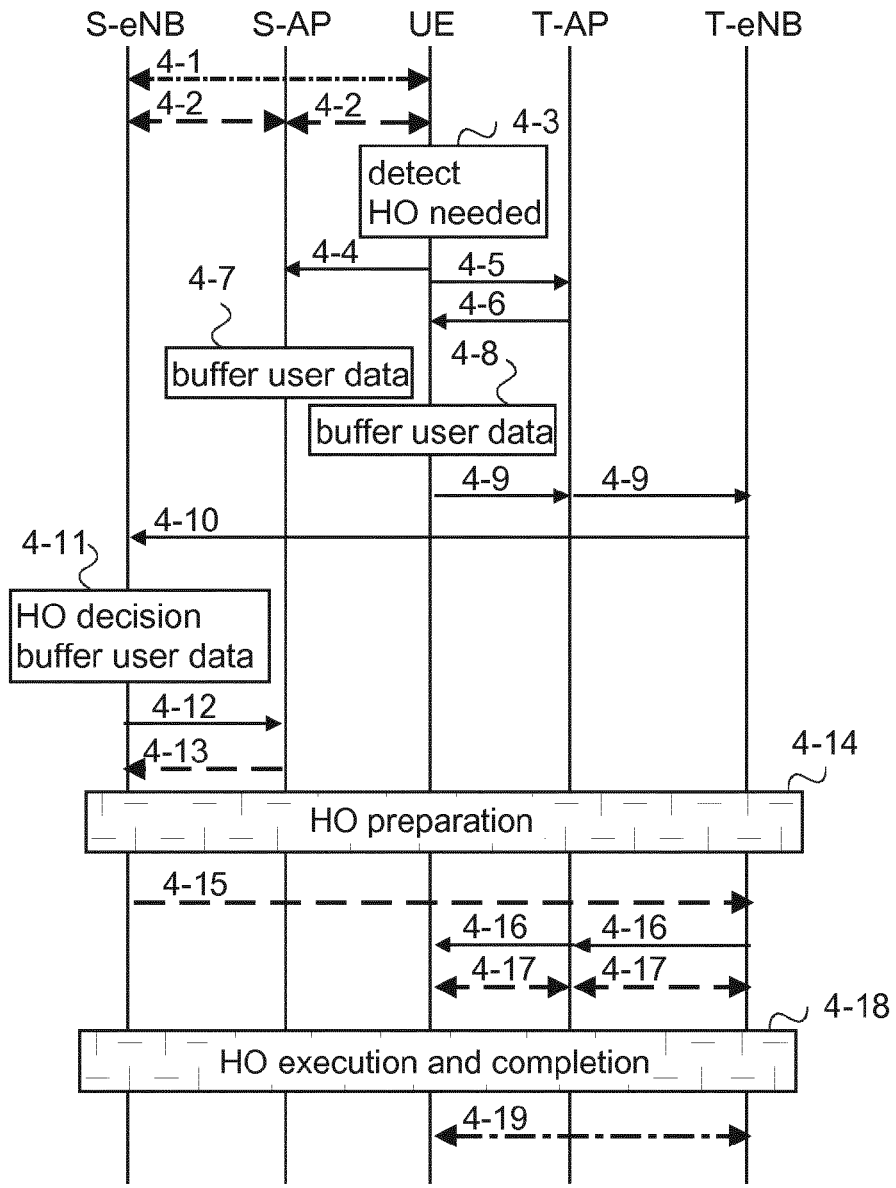

It should be appreciated that the radio access network may be implemented without the centralized access router, or corresponding functionality, as is evident from examples illustrated in FIGS. 3 and 4, for example.

The user equipment 500 refers to a portable computing device (apparatus), and it may also be referred to as a user terminal. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), handset, laptop computer, e-reading device, tablet. In the example situation of FIG. 1, the user equipment 500 is connected to the macro base station 21 over the link 110 and to the small base station 22 over the link 120.

Figure 2:
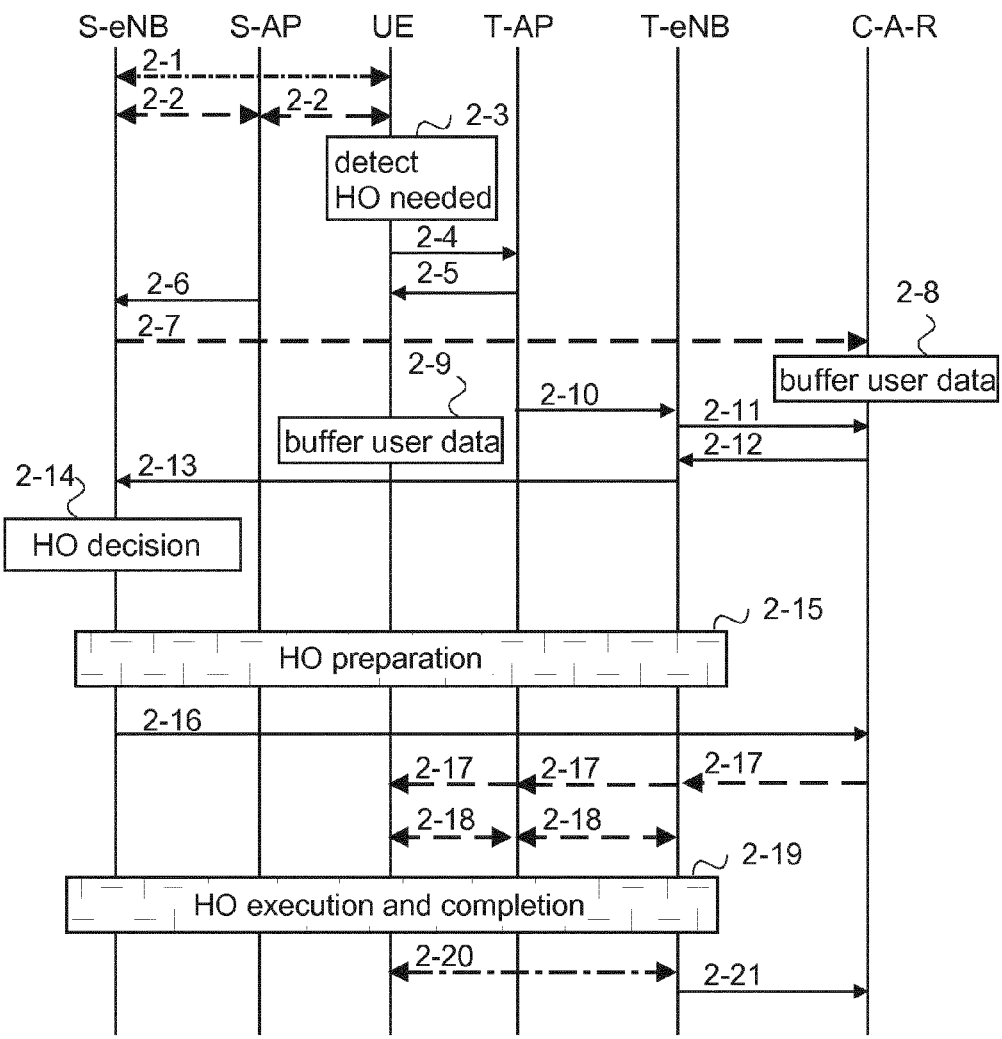
FIGS. 2 to 4 are charts illustrating exemplary information exchange.

FIGS. 2 to 4 illustrate different examples of handover procedures when the user equipment 500 moves from the small cell 220 towards the small cell 220'. The handover procedure between macro cells is assumed to contain three separate phases: a handover preparation phase, a handover execution phase and a handover completion phase. Since no amendments are needed for the actual phases, they are not described in detail here.

In the examples it is assumed that the user equipment is allowed to associate with an access point without any actual user plane and control plane handover. Herein the association means that at least a unique identity of the user equipment, like a media access control (MAC) address of the user equipment or any corresponding hardware or software address or other information that uniquely identifies the user equipment, is available in the access point, and correspondingly a unique identity of the access point is available in the user equipment. Further, in the examples it is assumed that the identity of the access point embeds information of the deploying eNB so that the deploying macro base station eNB is recognizable from the identity of the local access point. However, it should be appreciated that other ways to determine identity of an eNB deploying an access point may be used.

In FIGS. 2 to 4, handover related information exchange is depicted with solid lines, control traffic not relating to a handover with dot-and-dash lines, and user data traffic with dashed lines.

FIG. 2 illustrates an example of a handover procedure in which the centralized access router entity is utilized. In the example it is assumed that user data traffic is suspended and then resumed.

FIG. 2 starts from a situation in which the user equipment UE has an active connection so that control plane traffic 2-1 is between a source evolved node B S-eNB and the user equipment and user plane traffic 2-2 is offloaded to a source access point S-AP.

Then UE detects, in point 2-3, that S-AP is fading away but another access point, target access point T-AP is coming stronger, and therefore a handover (HO) is needed. UE initiates the handover by associating with T-AP. The associating comprises sending the unique identity of UE in message 2-4 to T-AP and receiving the unique identity of T-AP in message 2-5. In the illustrated example it is assumed that UE may be associated only with one access point at a time, and that S-AP detects the disassociation by not receiving responses from UE, and therefore S-AP informs deploying S-eNB by message 2-6 that no more user data traffic can be delivered to UE via S-AP. S-AP may detect the disassociation also by receiving corresponding information from UE. However, since no handover has taken place, in the illustrated example S-eNB starts to forward the offloaded user plane data in message(s) 2-7 to the centralized router access C-A-R, which buffers, in point 2-8, user data from network to UE. (The S-eNB may be configured to send before sending user data to be buffered, message informing C-A-R about the user data to be buffered.) Correspondingly, UE starts to buffer, in point 2-9 user data from UE to the network. More precisely, there is no user plane data traffic between S-AP and UE, no user plane data traffic from S-AP to S-eNB, and in the illustrated example there is no user plane data traffic from S-eNB to S-AP.

In response to associating (or re-associating) with a non-served UE (i.e. UE that is not yet served), T-AP reports to the evolved node B deploying T-AP, i.e. T-eNB about the newly associated UE. More precisely, T-AP sends to T-eNB in message 2-10 the unique identity of UE that T-AP received in message 2-4.

In response to receiving message 2-10, T-eNB queries, by sending message 2-11, from the centralized access router C-A-R whether or not UE is active. In the illustrated example UE is active and a query response 2-12 contains the cellular context of UE that is in the mapping information. The cellular context includes source cell information, i.e. information on S-eNB. Using the information, T-eNB sends message 2-13 to S-eNB, message 2-13 indicating that a local offloading layer assisted macro base station handover is determined to be necessary by UE.

In response to message 2-13 S-eNB decides, in point 2-14 to trigger a handover to T-eNB. The handover is a simultaneous two layer handover, i.e. a handover between macro base stations triggered by a handover between small base stations. It suffices for the handover decision in the macro base station that the macro base station receives information indicating that the user equipment has associated to the new small base station. In other words, the information in message 2-13 is sufficient for the handover decision in S-eNB and no additional information is needed. However, it should be appreciated that measurements reports from the user equipment, the measurement reports comprising information on the target macro cell, may be taken into account if they are available, and some measurements reports may be needed if S-eNB and S-AP use the same frequency band. The handover to T-eNB comprises control plane handover in the radio access network, and control plane and user plane handover to the core network in which the user plane path and the control plane path need to be handed over from S-eNB to T-eNB. However, since UE is already associated with T-AP, no user plane radio access network handover is triggered at his point.

After the handover preparation phase (point 2-15) between S-eNB and T-eNB has been performed, S-eNB instruct by message 2-16 the centralized access router C-A-R to forward buffered user data in message(s) 2-17 to T-eNB, which then forwards in message(s) 2-17 the buffered user data via T-AP to UE. In another implementation, it is T-eNB that instructs the centralized access router C-A-R to forward buffered user data, i.e. message 2-16 is sent from T-eNB. This resumes the user plane data traffic over the radio access network so that after that there is user plane data traffic 2-18 between T-eNB and UE via T-AP, and UE can transmit buffered user data to T-eNB via T-AP.

When the handover execution phase and the handover completion phase (point 2-19) between UE and macro cells (i.e. between S-eNB and T-eNB) has been completed, also the control plane signalling 2-20 has been handed over to T-eNB, and T-eNB sends message 2-21 to update the mapping information of UE in the centralized router access entity so that T-AP and T-eNB are identified in the cellular context.

Instead of C-A-R buffering user data traffic from the network towards the user equipment, S-eNB or S-AP may perform the buffering. Yet another alternative includes S-AP buffering until the handover decision is made by S-eNB, and S-eNB buffering therefrom. If S-eNB buffers the user data, it forwards it to T-eNB instead of sending message 2-16. If S-AP performs the buffering, S-eNB may be configured to request buffered user data, or S-AP may be configured to forward the buffered user data either via S-eNB or using a direct backhaul link.

FIG. 3 illustrates another example of a handover procedure. In the illustrated example the centralized access router entity is not utilized. In the example it is assumed that user data traffic is suspended and then resumed.

FIG. 3 starts from a situation in which the user equipment UE has an active connection so that control plane traffic 3-1 is between a source evolved node B S-eNB and the user equipment and user plane traffic 3-2 is offloaded to a source access point S-AP.

Then UE detects, in point 3-3 that S-AP is fading away but another access point, target access point T-AP is coming stronger, and therefore a handover (HO) is needed. UE initiates the handover by associating with T-AP. In the illustrated example it is assumed that UE may be associated only with one access point at a time, and that the UE is configured to inform S-AP that the association with UE is not any more valid by message 3-4. Message 3-4 may be a disassociation message, for example. However, there is no need to send such a message, S-AP may detect that the association is not any more valid because it does not receive responses from UE. The associating comprises sending the unique identity of UE in message 3-5 to T-AP and receiving the particular identity of T-AP in message 3-6. Further, UE sends message 3-7 to S-eNB to report the new association. Message 3-7 may be an existing RRC (radio resource control) signalling message, like a measurement report, with an extended information element that includes at least the unique identity of T-AP, or a UE initiated handover request including the unique identity of T-AP, or a cell change indication including the unique identity of T-AP. Message 3-7 may comprise also other information relating to the new association and/or the old association and/or reasons that caused the change of the access point. Further, UE starts to buffer, in point 3-8 user data from UE to the network.

In response to message 3-7, S-eNB determines the macro base station deploying T-AP by using the identity of T-AP. Since T-AP is not deployed by S-eNB, S-eNB starts to buffer, in point 3-9, user data from network to UE. More precisely, there is no user plane data traffic between S-AP and UE and between S-AP and S-eNB. Further, S-eNB triggers the handover preparation procedure 3-11 with T-eNB by sending message 3-10. Message 3-10 may be a handover request message and information of T-AP may be embedded to message 3-10. Having information on T-AP in message 3-10 enables to resume the user plane data traffic earlier. One can say that message 3-10 indicates that a local offloading layer assisted macro base station handover is determined to be necessary by UE, and such a two layer handover is triggered.

After the handover preparation phase (point 3-11) between S-eNB and T-eNB has been performed, S-eNB indicates (message 3-12), for example together with handover command signalling, UE to resume user plane data traffic 3-13 with T-eNB via T-AP. In other words, S-eNB indicates either explicitly or implicitly to UE that (after the preparation phase) T-eNB has valid context for UE that allows T-eNB to identify the user data to/from UE via T-AP. Further, S-eNB forwards buffered user data in message(s) 3-14 to T-eNB, which then forwards the buffered user data via T-AP to UE using the resumed user plane data traffic.

When the handover execution phase and the handover completion phase (point 3-15) between UE and macro cells (i.e. between S-eNB and T-eNB) has been completed, also the control plane signalling 3-16 has been handed over to T-eNB.

FIG. 4 illustrates another example of a handover procedure. In the illustrated example the centralized access router entity is not utilized. In the example it is assumed s that user data traffic is suspended and then resumed.

FIG. 4 starts from a situation in which the user equipment UE has an active connection so that control plane traffic 4-1 is between a source evolved node B S-eNB and the user equipment and user plane traffic 4-2 is offloaded to a source access point S-AP.

Then UE detects, in point 4-3, that S-AP is fading away but another access point, target access point T-AP is coming stronger, and therefore a handover (HO) is needed. UE initiates the handover by associating with T-AP. In the illustrated example it is also assumed that UE may be associated only with one access point at a time, and in this example S-AP is informed that the association with UE is not any more valid by message 4-4. Alternatively, S-AP may detect that it does not receive any responses. Further, in the example, since no handover has taken place, S-AP starts to buffer, in point 4-7, user data from network to UE. It should be appreciated that alternatively S-AP may indicate S-eNB to start to buffer. The associating comprises sending the unique identity of UE in message 4-5 to T-AP and receiving the unique identity of T-AP in message 4-6. UE also starts to buffer, in point 4-8, user data from UE to the network. More precisely, there is no user plane data traffic between S-AP and UE, no user plane data traffic from S-AP to S-eNB but in this example there still is user plane data traffic from S-eNB to S-AP.

Further, UE initiates a handover request by sending message 4-9 to T-eNB via T-AP using common user-plane connection (radio bearer/radio link) provided by T-AP between T-eNB and user equipments served by T-AP. Message 4-9 includes at least the unique identity of UE and the unique identity of S-AP. Message 4-9 may be a user-plane control packet data unit (U-plane C-PDU).

In response to receiving message 4-9, T-eNB determines the macro base station deploying S-AP by using the identity of S-AP received in message 4-9. Since S-AP is not deployed by T-eNB, T-eNB sends message 4-10 to S-eNB, message 4-10 indicating that a local offloading layer assisted macro base station handover is determined to be necessary by UE.

In response to message 4-10 S-eNB decides, in point 4-11 to trigger a handover to T-eNB and starts to buffer user data. After that no user data is sent from S-eNB to S-AP. Further, S-eNB requests (message 4-12) S-AP to forward user data buffered in S-AP for UE. If S-AP has buffered user data for UE, the buffered user data is forwarded (message 4-13) to S-eNB.

After the handover preparation phase (point 4-14) between S-eNB and T-eNB has been performed, S-eNB forwards buffered user data in message(s) 4-15 to T-eNB, which then resumes the user plane data traffic by transmitting a resumption indication to UE in message 4-16 via T-AP. The resumption indication may be transmitted as U-plane C-PDU using the common user plane connection. Alternatively message 4-16 may be an explicit control plane indication to resume user data transmission. Yet a further alternative is implicitly indicate the resumption by resuming the user data transmission from T-eNB to UE via T-AP. This resumes the user plane data traffic so that after that there is user plane data traffic 4-17 between T-eNB and UE via T-AP, and the buffered user data may be transmitted from UE to T-eNB and/or the forwarded buffered user data (message(s) 4-15) may be forwarded from T-eNB to UE.

When the handover execution phase and the handover completion phase (point 4-18) between UE and macro cells (i.e. between S-eNB and T-eNB) has been completed, also the control plane signalling 4-19 has been handed over to T-eNB.

In another implementation, when T-eNB receives message 4-9, it may be configured to use the identity of the user equipment who sent the message, to obtain information on S-eNB by quering the centralized access router, as described above with messages 2-10 and 2-11 with FIG. 2. In the implementation message 4-9 may contain an identity for S-AP wherefrom S-eNB cannot be deduced, or message 4-9 may be sent without an identity for S-AP.

It should be appreciated that the different alternatives for buffering and resuming user data described above with an example are interchangeable. For example, messages/points 2-6 to 2-7 may be replaced by message 3-7 or by messages/points 4-4, 4-7-4-12 and 4-13, and vice versa. Messages 2-16 to 2-18 may be replaced by messages 3-12 to 3-14 or by messages 4-15 to 4-17, and vice versa. Further, there may be implementations in which user data is not buffered. For example, if two simultaneous associations to small base stations is supported, there is not even need to buffer. Yet there may be implementations in which the resuming user plane data traffic happens simultaneously with the completion of the handover.

Further, it should be appreciated that the handover decision made in S-eNB may be made using the information described in detail with point 2-14 although the detailed description is not repeated with points 3-9 and 4-11.

As is evident from the above examples, the handover between macro base stations may be triggered by an inter-small base stations handover instead of radio measurement triggered handover. Hence inter-cell inter-frequency measurements are avoided as much as possible. Further, since inter-small base station and inter-macro base station handovers are coupled together, the signalling overhead for controlling the two handovers may be kept low, especially over the air interface.

Thanks to the user equipment associating with a new small base station when handover criteria is met, and the associating triggering an inter-macro base station handover, preparation of the handover between cells can be made early enough so that the fact that offloaded user plane may suffer problems earlier than control plane is taking into account. Further, since the user plane interruption in the radio network may be resumed before the control plane handover is completed, the handover latency of the user plane is reduced. However, even if the resuming user plane data traffic happens simultaneously with the completion of the handover the amount of control signalling is reduced and hence latency is reduced.

Figure 5:
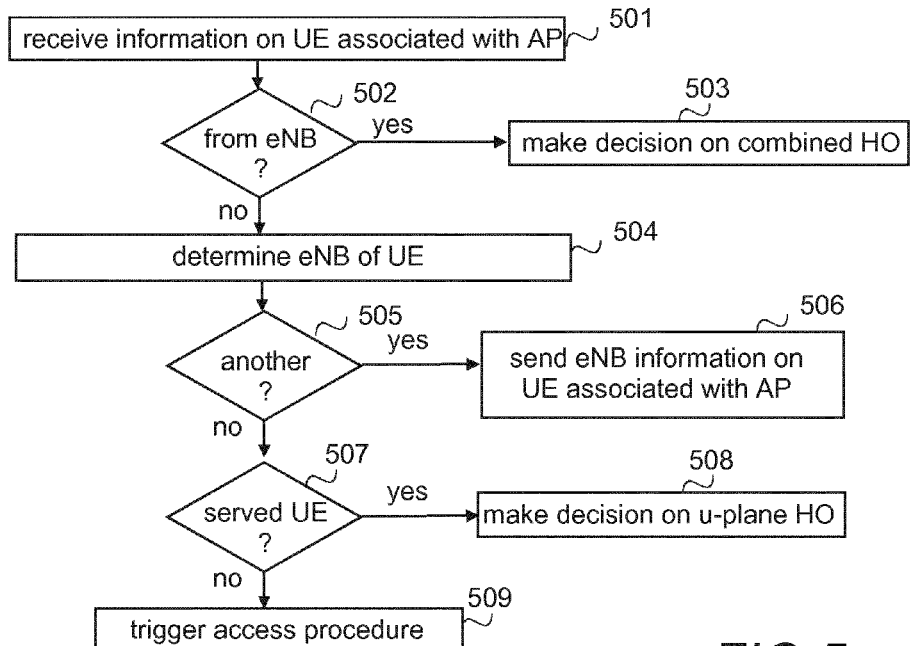
FIGS. 5 to 7 are flow charts illustrating exemplary functionalities of apparatuses.

FIG. 5 is a flow chart illustrating functionality of a macro base station in implementations in which a macro base station of a target access point is the first informed macro base station on the new association.

When information indicating that a user equipment (UE) has just performed an association with an access point (AP) is received in step 501, the macro base station checks in step 502, whether or not the information was received from another macro base station (eNB). Referring to the above examples of FIGS. 2 and 4, it is checked whether message 2-10, 4-9 or message 2-12, 4-10 was received.

If the information was received from another macro base station (step 502), it is information indicating that a local offloading layer assisted macro base station handover is determined to be necessary by the user equipment, and the macro base station is a currently serving macro base station of the user equipment, and makes in step 503 a handover (HO) decision.

If the message was not received from another macro base station (step 502), the macro base station is a macro base station deploying the target access point. Therefore, the macro base station deploying the source access point of the user equipment, i.e. a currently serving macro base station of the user equipment, is determined in step 504. The currently serving macro base station may be determined from the information received in step 501, like an identity of a serving access point, or it may be determined by querying the information from a centralized access router using information received in step 501. When the serving macro base station is determined, it is checked in step 505, whether or not the serving macro base station is another macro base station.

If the serving macro base station is another macro base station (step 505) information indicating that the user equipment has just performed an association with the access point is sent in step 506 to the serving macro base station. The information indicates that a local offloading layer assisted macro base station handover is determined to be necessary by the user equipment.

If the serving macro base station is not another macro base station it is checked in step 507, whether or not the user equipment is a served user equipment. If the user equipment is a served user equipment, an inter-access point handover for offloaded user traffic may be necessary within the service area of the macro base station, and a decision on a user plane handover is made in step 508.

If the user equipment is not a served user equipment (step 507), it is a user equipment requesting access to the system via an access point, and an access procedure is triggered in step 509.

In another implementation, the macro base station is configured to check in step 501 whether or not it already contains cellular context of UE, and if it does not, to continue to step 503 to decide on combined handover. If the macro base station contains the cellular context, it will continue to step 504 to determine the macro base station of the user equipment.

Figure 6:
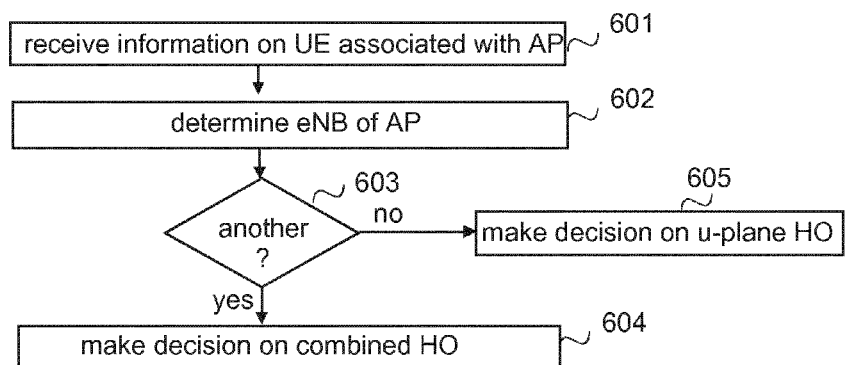

FIG. 6 is a flow chart illustrating functionality of a macro base station in implementations in which a macro base station of a source access point is the first informed macro base station on the new association, and the information indicates that it relates to a handover requests.

When information, indicating that a user equipment (UE) has just performed an association with an access point (AP) because the user equipment deemed that a handover between the access points is necessary, is received in step 601, a macro base station deploying the target access point is determined in step 602. The target macro base station may be determined from the information received in step 601, like from an identity of a target access point. After the target macro base station is determined, it is checked in step 603, whether or not the target macro base station is another macro base station.

If the target macro base station is another macro base station (step 603) a combined handover (HO) decision is made in step 604.

If the target macro base station is not another macro base station (step 603) an inter-access point handover for offloaded user traffic may be necessary within the service area of the macro base station, and a decision on a user plane handover is made in step 605.

Figure 7:
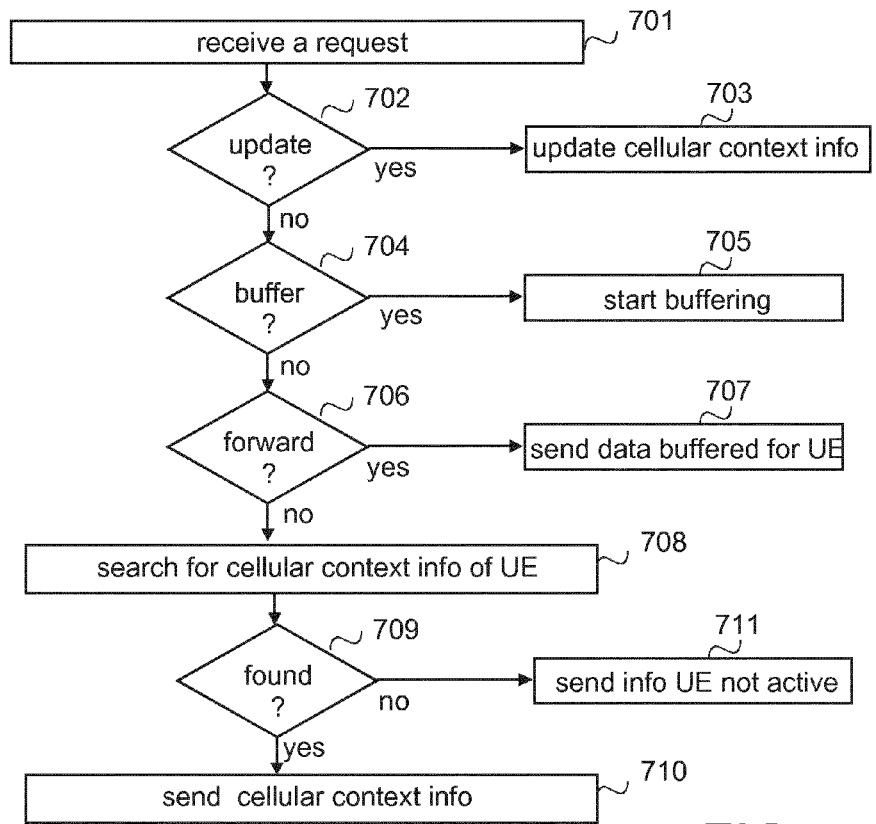

FIG. 7 is a flow chart illustrating functionality of a centralized access router in implementations utilizing such an access router. Further, in the example the centralized access router is configured to buffer user data, if requested, and to forward the buffered user data, if requested.

When a request is received in step 701, it is determined in step 702, whether or not the request is an update to the mapping information maintained by the centralized access router. If it is an update, corresponding cellular context information in the mapping information is updated in step 703. The updating may include creating a new entry for a user equipment not yet having a cellular context information, deleting an existing entry for a user equipment not any more active or not having any more offloaded user traffic or updating small base station and/or serving macro base station information in the cellular context information for a user equipment.

If the request is not an update (step 702), it is determined in step 704, whether or not the request is a request to buffer by the centralized access router user data intended to be transmitted to a user equipment. If it is a request to buffer, buffering of user data for a user equipment is started in step 705.

If the request is not a request to buffer (step 704), it is determined in step 706, whether or not the request is a request to forward user data buffered for a user equipment. If it is request to forward, buffered user data for the user equipment is forwarded in step 707 to a target network entity indicated in the request.

If the request is not a request to forward user data (step 706), it is a query relating to a user equipment. Therefore cellular context information of the user equipment is searched for in step 708, and if found (step 709), the cellular context information of the user equipment is sent in step 710 as a query response. If no cellular context information is found (step 709), information indicating that the user equipment is not active (i.e. either not active at all or not having offloaded user data) is sent in step 711 as a query response. The information sent in step 711 may be a negative acknowledgement or an empty response, for example.

In an implementation in which the centralized access router is not configured to buffer user data, steps 704 to 707 are omitted, and the process continues directly to step 708 to search for cellular context information of a user equipment if the received request is determined in step 702 not to be an update.

Figure 8:
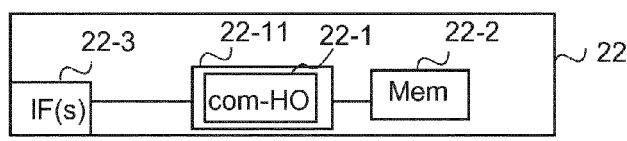
FIGS. 8 to 10 are schematic block diagrams of exemplary apparatuses.

FIG. 8 is a simplified block diagram illustrating some units for an apparatus 22 configured to provide a macro cell.

In the illustrated example the apparatus comprises one or more user interfaces (IF) 22-3 for receiving and transmitting information, a processor 22-11 comprising a combined handover unit (com-HO) 22-1 and memory 22-2 usable for storing a program code required for the combined handover unit and/or for buffering user data traffic. The apparatus comprises the combined handover unit at least for deciding to make an inter-macro base station handover in response to receiving information on an inter-small base station handover and/or for informing another macro base station on an inter-small base station handover performed by association as described above with eNBs. Further, the combined handover unit 22-1 may be configured to determine or obtain by querying an address or corresponding information on the other macro base station, and/or update cellular context information of a user equipment in the centralized access router, and/or buffer user data, and/or forward buffered user data, and/or instruct to resume user data traffic. However, one or more of the previous configurations may be implemented by different separate units. Further, the combined handover unit 22-1 may be an integral part of a handover unit responsible for all possible handovers.

Figure 9:
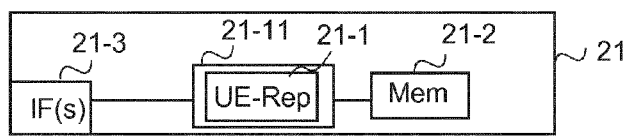

FIG. 9 is a simplified block diagram illustrating some units for an apparatus 21 configured to provide a small cell. In the illustrated example the apparatus comprises one or more user interfaces (IF) 21-3 for receiving and transmitting information, a processor 21-11 comprising a user equipment reporting unit (UE-rep) 21-1 and memory 21-2 usable for storing a program code required for the user equipment reporting unit and/or for buffering user data traffic. The apparatus comprises the user equipment reporting unit at least for reporting a new association with a user equipment to an apparatus providing a macro cell deploying the small cell, as described above with T-AP. However, it should be appreciated that an apparatus may provide a small cell without the user equipment reporting unit and/or without memory for buffering user data traffic.

Figure 10:
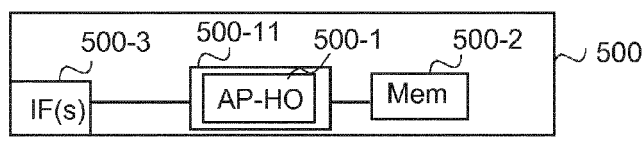

FIG. 10 is a simplified block diagram illustrating some units for an apparatus 500 configured to be a user equipment. In the illustrated example the apparatus comprises one or more user interfaces (IF) 500-3 for receiving and transmitting information, a processor 500-11 comprising a small cell handover unit (AP-HO) 500-1 and memory 500-2 usable for storing a program code required for the small cell handover unit and/or for buffering user data traffic. The apparatus comprises the small cell handover unit at least for detecting that a small cell handover for an offloaded user data is needed and for associating with a new small cell. Further, the small cell handover unit 500-1 may be configured to inform the serving macro cell or a macro cell deploying the new small cell about the associating and/or resume user data according to received instructions or in response to received downlink user data, as described above. However, one or more of the previous configurations may be implemented by different separate units. Further, the small cell handover unit 500-1 may be an integral part of a handover unit responsible for all possible handovers.

In other words, the apparatus 21 configured to provide the macro cell (an exemplary block diagram of such an apparatus being illustrated in FIG. 9), and/or the apparatus 22 configured to provide the small (an exemplary block diagram of such an apparatus being illustrated in FIG. 9) cell, and/or the apparatus 600 configured to provide centralized access router (an exemplary block diagram of such an apparatus being illustrated in FIG. 1), and/or the apparatus 500 configured to provide the mobile user equipment (an exemplary block diagram of such an apparatus being illustrated in FIG. 10), is a computing device that may be any apparatus or device or equipment or network node configured to perform one or more of corresponding apparatus functionalities described with an embodiment/example/implementation, and it may be configured to perform functionalities from different embodiments/examples/implementations. The unit(s) described with an apparatus may be separate units, even locate in another physical apparatus, the physical apparatuses forming one logical apparatus providing the functionality, or integrated to another unit in the same apparatus. In other embodiments, an unit in an apparatus, or part of the unit's functionality, may locate in another physical apparatus. It should be appreciated that the apparatus may be in one physical apparatus or distributed to two or more physical apparatuses acting as one logical apparatus.

More precisely, the units and entities illustrated in FIGS. 1 and 8 to 10 may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding apparatus/entity described with an embodiment/example/implementation comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

An apparatus implementing functionality or some functionality according to an embodiment/example/implementation of a macro base station, small base station, a centralized access router or a user equipment may generally include a processor, controller, control unit, micro-controller, or the like connected to a memory and to various interfaces of the apparatus. Generally the processor is a central processing unit, but the processor may be an additional operation processor. Each or some or one of the units/entities described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/entities described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, each or some or one of the units/entities described above may be an element that comprises one or more arithmetic logic units, a number of special registers and control circuits.

An apparatus implementing functionality or some functionality according to an embodiment/example/implementation of a macro base station, small base station, a centralized access router or a user equipment may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. The memory may also store computer program code such as software applications (for example, for one or more of the units/entities) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus, a distributed database and a cloud server.

An apparatus implementing functionality or some functionality according to an embodiment/example/implementation of a macro base station, small base station, a centralized access router or a user equipment generally comprise different interface units, such as one or more receiving units for receiving user data, control information, requests and responses, for example, and one or more sending units for sending user data, control information, responses and requests, for example. The receiving unit and the transmitting unit each provides an interface in an apparatus, the interface including a transmitter and/or a receiver or any other means for receiving and/or transmitting information, and performing necessary functions so that user data, control information, etc. can be received and/or transmitted. The receiving and sending units may comprise a set of antennas, the number of which is not limited to any particular number.

Further, an apparatus implementing functionality or some functionality according to an embodiment/example/implementation of a macro base station, small base station, a centralized access router or a user equipment may comprise other units, like a user interface unit.

The steps, information exchange messages and related functions and points described above in FIGS. 2 to 7 are in no absolute chronological order, and some of the steps/points/information exchange may be performed simultaneously or in an order differing from the given one. Other functions can also be executed between the steps/points/related functions or within the steps/points/related functions. Some of the steps/points/information exchange or part of the steps/points/information exchange can also be left out or replaced by a corresponding step/point/information exchange or part of the step/point/information exchange. The messages (requests, responses, etc.) are only exemplary and may even comprise several separate messages for transmitting the same information, and the messages and associated points may use different protocols. In addition, the messages may also contain other information.

It should be appreciated that as used herein, the term "user equipment" (UE) may be synonymous to a mobile user, mobile station, mobile terminal, user, subscriber, wireless terminal and/or remote station and may describe a remote user of wireless resources in a wireless communication network. The term "nodeB" or "access point" may be understood as a one or more cells, cell sites, base stations, transceivers, access points, and/or any terminus of radio frequency communication. Although current network architectures may consider a distinction between mobile/user devices and access points/nodeBs, the example embodiments described hereafter may generally be applicable to architectures where that distinction is not so clear, such as ad hoc and/or mesh network architectures, for example.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   receiving, by a base station, a first information indicating that a user equipment served with offloaded user data traffic by a first small cell has associated with a second small cell, the first small cell controlled by a first macro cell;
   detecting, by the base station, that the second small cell is not controlled by the first macro cell;
   based on the detecting that the second small cell is not controlled by the first macro cell triggering, by the base station, a handover of the user equipment from the first macro cell to a second macro cell controlling the second small cell;
   sending a query to a network node maintaining mapping information on the user equipment having at least some user data offloaded from a macro cell to a small cell, the mapping information comprising at least some context information; and
   receiving information comprising the context information in a query response.

2. The method as claimed in claim 1, further comprising:
   receiving the first information in the first macro cell in a control traffic from the user equipment, the information comprising information on the second small cell;
   determining, from the information on the second small cell, the second macro cell deploying the second small cell; and
   triggering the handover by making a handover decision and contacting the second macro cell.

3. The method as claimed in claim 2, wherein the control traffic conveying the first information is a radio resource control signaling message with an extended information element for the information on the second small cell, or a user equipment initiated handover request, or a cell change indication message.

4. The method as claimed in claim 1, further comprising:
   receiving the first information in the second macro cell from the second small cell, the first information comprising information on the user equipment;
   using the information on the user equipment to obtain context information of the user equipment, the context information including for an active user equipment at least information on a macro cell deploying the first cell; and
   triggering the handover by sending from the second macro cell to the first macro cell information indicating that the user equipment has associated with the second small cell deployed by the second macro cell.

5. The method as claimed in claim 4, further comprising:
   receiving the first information in the second macro cell over a common user plane radio connection provided by the second small cell between the user equipment and the second macro cell, the first information comprising information on the user equipment as a sender of the first information.

6. The method as claimed in claim 1, further comprising:
receiving the first information in the second macro cell from the user equipment over a common user plane radio connection via the second small cell, the first information comprising information on the first small cell;
determining, from the information on the first small cell, the first macro cell deploying the first cell; and
triggering the handover by sending from the second macro cell to the first macro cell information indicating that the user equipment has associated with the second small cell deployed by the second macro cell.

7. A method as claimed in claim 6, further comprising receiving the first information in a user plane control packet data unit.

8. The method as claimed in claim 1, further comprising:
receiving the first information in the first macro cell from the second macro cell; and
detecting, in response to receiving the first information from the second macro cell, that the second small cell is not deployed by the first macro cell deploying the first small cell.

9. The method as claimed in claim 1, further comprising:
instructing to resume user data traffic via the second small cell after completing a handover preparation phase for control traffic between the first macro cell and the second macro cell; and
executing and completing the handover for the control traffic.

10. The method as claimed in claim 9, wherein the instructing comprises sending a resumption indication signaling message from the second macro cell via the second small cell, or forwarding downlink user data via the second macro cell and the second small cell, or sending a resumption indication signaling message from the first macro cell to the user equipment.

11. A method comprising:
receiving, by a base station, a first information indicating that a user equipment served with offloaded user data traffic by a first small cell has associated with a second small cell, the first small cell controlled by a first macro cell;
detecting, by the base station, that the second small cell is not controlled by the first macro cell;
based on the detecting that the second small cell is not controlled by the first macro cell, triggering, by the base station, a handover of the user equipment from the first macro cell to a second macro cell controlling the second small cell;
sending a query to a network node maintaining mapping information on the user equipment having at least some user data offloaded from a macro cell to a small cell, the mapping information comprising at least some context information; and
receiving information comprising the context information in a query response.

12. The method as claimed in claim 11, further comprising:
sending the first information to a first macro cell deploying the first small cell for offloading, the first information comprising information on the second small cell.

13. The method as claimed in claim 11, wherein the first information is sent in a radio resource control signaling message with an extended information element for the information on the second small cell, or a user equipment initiated handover request, or a cell change indication message.

14. The method as claimed in claim 11, further comprising:
sending, over a common user plane radio connection via the second small cell, the first information to a second macro cell deploying the second small cell for offloading, the first information comprising information on the first small cell.

15. The method as claimed in claim 14, wherein the first information is sent in a user plane control packet data unit.

16. An apparatus comprising:
at least one processor; and
at least one memory including computer program code, wherein the at least one memory and the computer program code are configured to, with the at least one processor, to cause a base station providing a first macro cell to perform at least:
receiving, by a base station, a first information indicating that a user equipment served with offloaded user data traffic by a first small cell has associated with a second small cell, the first small cell controlled by a first macro cell;
detecting, by the base station, that the second small cell is not controlled by the first macro cell;
based on the detecting that the second small cell is not controlled by the first macro cell, triggering, by the base station, a handover of the user equipment from the first macro cell to a second macro cell controlling the second small cell;
sending a query to a network node maintaining mapping information on the user equipment having at least some user data offloaded from a macro cell to a small cell, the mapping information comprising at least some context information; and
receiving information comprising the context information in a query response.

17. The apparatus as claimed in claim 16, wherein the at least one memory and the computer program code are further configured, with the at least one processor, to cause the apparatus to perform at least:
receiving the first information in the first macro cell in a control traffic from the user equipment, the information comprising information on the second small cell;
determining, from the information on the second small cell, the second macro cell deploying the second small cell; and
triggering the handover by making a handover decision and contacting the second macro cell.

18. The apparatus as claimed in claim 16, wherein the at least one memory and the computer program code are further configured, with the at least one processor, to cause the apparatus to perform at least:
receiving the first information in the second macro cell from the second small cell, the first information comprising information on the user equipment;
using the information on the user equipment to obtain context information of the user equipment, the context information including for an active user equipment at least information on a macro cell deploying the first cell; and
triggering the handover by sending from the second macro cell to the first macro cell information indicating that the user equipment has associated with the second small cell deployed by the second macro cell.

19. A computer program product comprising a non-transitory computer readable medium comprising program instructions executed by at least one processor to perform the steps of a method as claimed in claim 1.

* * * * *